June 29, 1965 R. H. MOYLE ETAL 3,192,047
METHOD FOR FEED PREPARATION
Filed Feb. 21, 1962
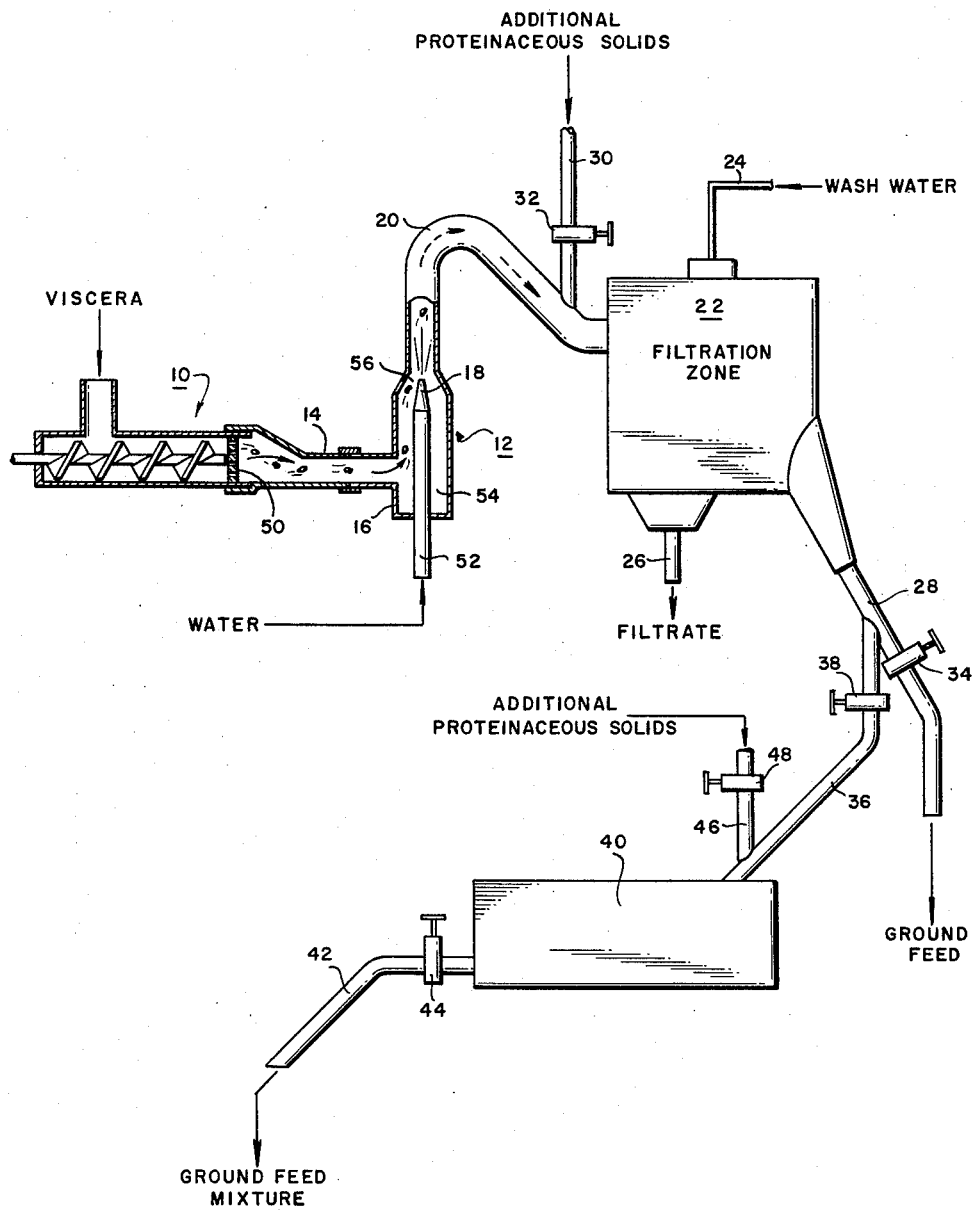
INVENTORS.
RODNEY H. MOYLE,
BY REX A. MOYLE,
ATTORNEY.

3,192,047
METHOD FOR FEED PREPARATION
Rodney H. Moyle and Rex A. Moyle, both of
Rte. 1, Eagle, Idaho
Filed Feb. 21, 1962, Ser. No. 175,872
7 Claims. (Cl. 99—7)

This invention relates to a method and apparatus for the preparation of a proteinaceous feed for carnivorous animals. More particularly, this invention relates to a method and apparatus for converting viscera, such as poultry viscera, into a high quality proteinaceous food for animals.

Animal viscera is known to contain high quantities of proteins and other nourishing materials which are potentially useful as food for carnivorous animals. Unfortunately, the viscera also contains a significant amount of feces. Frequently, and especially in the case of poultry viscera, the feces will contain medicinal degradation products that can be tolerated by poultry but are extremely harmful to animals. For example, poultry viscera will frequently contain zinc and mercury compounds initially ingested by the poultry for the control of coccidiosis.

Because of the crimped muscular structure of the intestinal portions of the viscera, it is extremely difficult to obtain a complete separation of the feces from the other components of the intestines and the viscera. This is the case even though proteinaceous components of the viscera, such as the intestines, are water insoluble, whereas the feces is water soluble. Thus, even when the viscera is ground to a fine condition and agitated in the presence of copious quantities of water, it is still not possible to obtain complete solution of the feces in the water because of the entrapment of small portions thereof in convolutions and folds of the intestines even if they are ground and in a finely divided condition. As a consequence, animal viscera and poultry viscera in particular has found only limited utility as a food supplement because of the contaminating presence of feces. For example, a food for mink or other fur bearing rodents and pets will normally contain less than about 10% by weight of comminuted viscera because of the contaminating presence of feces therein.

Accordingly, an object of the present invention is the provision of an improved method of comminuting and cleaning viscera in order to obtain a substantially complete separation of the feces from the comminuted proteinaceous components of the viscera.

Another object of the present invention is the provision of apparatus for comminuting viscera and for substantially completely washing the viscera clean of feces.

Still another object is the provision of a food for animals substantially free from feces and containing a high percentage of comminuted animal viscera.

The manner in which these and other objectives are obtained will be more clearly apparent from the accompanying drawing and the following description of a preferred embodiment of the present invention.

In the drawing, the sole figure is a schematic flow sheet of a preferred embodiment of the present invention with the comminuting means and washing means schematically shown in greater detail.

Turning now to the drawing, there is disclosed a viscera treating means comprising a comminuter, such as a grinder, designated generally by the numeral 10. Venturi vacuum expansion means including jet washing means designated generally by the numeral 12 are connected by a conduit 14 with the discharge end of the grinder 10, the conduit 14 being connected with the spaced casing 16 for a venturi jet 18 on the upstream (vacuum) side of the venturi 18.

A discharge conduit 20 connected with the casing 16 leads to a filtration zone 2, wherein comminuting and cleaned viscera is filtered and wherein a proteinaceous filter cake from the filter operation is washed with fresh water in order to substantially completely remove filtrate from the viscera. The wash water is supplied to filtration zone 22 through line 24 and the feces-contaminated filtrate and wash water are discharged from the zone 22 by a discharge line 26. The cleaned, comminuted substantially feces-free viscera is discharged from zone 22 by way of a conduit or chute 28 leading to a suitable storage zone (not shown).

In accordance with a modified form of the present invention, a supplemental proteinaceous solid, such as poultry feet or poultry heads, or similar by-products from the slaughtering of animals or poultry is charged to the filtration zone 22 by way of a conduit or chute 30 containing flow control means such as a valve or gate 32.

In accordance with another embodiment of our invention, the discharge conduit 28 from filtration zone 22 is blocked (e.g. by a valve or gate 34) and the products from the line 28 are conveyed by a branch conduit or chute 36 controlled by a valve or gate 38 which leads to a second grinding zone 40, which may be of a construction which is the same as, or different from, the construction of grinder 10.

Within the zone 40 the cleaned viscera and supplemental proteinaceous material are reground to provide a homogeneous mixture which is discharged from zone 40 by way of a conduit or chute 42 controlled by a valve or gate 44.

In accordance with a still further modification of the present invention, all or a part of the supplementary proteinaceous material is added directly to the zone 40 (e.g. by a conduit or chute 46 controlled by a valve or gate 48). It will be understood that supplementary proteinaceous solids may be fed simultaneously to zone 22 and zone 40 through conduits 30 and 46 respectively, when so desired.

*Operation*

By way of example, crude poultry viscera such as chicken viscera obtained from poultry slaughtering operations may be conveyed in an appropriate manner (not shown) to the grinder 10. For example, the poultry viscera from a conveyor line may be placed in a trough (not shown) containing running water to provide a vehicle for conveying the viscera to grinder 10. Within the grinder 10, the viscera and water mixture is comminuted and forced through a grinder head 50 as discrete solid particles which are desirably less than ½ inch and more preferably less than ¼ inch in length. At this point the comminuted viscera will contain its original content of feces and moreover, because of the crimped nature of the intestines, much of the feces will be trapped in folds of the comminuted intestines.

At the same time, a stream of water from any suitable source (not shown) is charged by a line 52 to the venturi jet 18 for flow therethrough. The pressure normally encountered in civic water lines will be adequate for this purpose when the jet 18 has a discharge diameter of about ¼" or less. Higher pressure may be used, if desired. As a consequence, a vacuum is induced in the throat or annulus 56 of the venturi means 12. Through the provision of a coupling means 14, such as a hose, between the discharge end of the grinder 10 and the throat section 56 of the venturi 12, a vacuum is formed which is normally sufficient to not only positively pull the comminuted viscera into the throat section 56 but also to expand the comminuted portions of the viscera to substantially completely unfold crimps of the solid portions thereof (e.g., intestines) and hence, expose substantially all of the surface area.

The thus expanded or exfoliated comminuted viscera is induced into the jet of water emanating from the jet 18 of the venturi means 12. Because of the high velocity of water jet, the induced viscera will be subjected to violent turbulent agitation which will act to further shred any shreddable components of the comminuted viscera and literally blast or otherwise remove the minute portions of feces from the uncrimped (exfoliated) comminuted viscera.

The resulting mixture, as indicated, is flowed from venturi means 12 through conduit 20 to a filtration zone 22, wherein water is removed from the proteinaceous solids to thereby obtain a filtrate 26 which will contain in solution substantially all of the feces initially present in the crude viscera. The mixture or slurry in the conduit 20 will suitably contain from about 5 to 50 weight percent of ground particles. The filter-cake that is formed is preferably washed free of any occluded filtrate with water introduced by line 24. The wash water is preferably discarded through line 26 along with the filtrate. The filtration zone 22 may be of any conventional desired construction, comprising, for example, a pan filter, leaf filter, rotary filter, etc. Preferably, as a matter of convenience and for an additional reason to be disclosed, the filtration zone 22 is a rotary filter of any desired construction. When a rotary filter is to be employed, and when it is desired to add additional proteinaceous material to the cleaned comminuted viscera, this may be conveniently accomplished by adding the meat scraps, chicken feet, chicken fat, chicken heads, meals, medicaments, etc., or mixtures thereof, to the filtration zone 22 through conduit 30 together with the slurry from the line 26 whereby the supplementary material will assist in filtration of the cleaned comminuted viscera.

As indicated, the filtrate 26 is discharged from filtration zone 22 and is preferably sewered because of its feces content.

The comminuted solid portions of the viscera alone, or in combination with supplementary materials, is discharged from zone 22 by conduit 28 and may be utilized at this point if desired as a food for carnivorous animals.

In accordance with an alternate method of operation, the conduit 28 is blocked at 34 and the solid comminuted material together with added proteinaceous solids is routed by conduit 36 to grinding zone 40, in order to comminute the added proteinaceous material. As indicated, still further quantities of proteinaceous solid may be simultaneously or alternately charged to grinder 40 through conduit 46.

In any event, the final product discharge from zone 40 will constitute a comminuted substantially feces-free food for carnivores.

Through the provision of the process and apparatus of the present invention whereby substantially complete removal of the feces is achieved, it is possible to provide a carnivore feed containing substantially in excess of 10% by weight of comminuted poultry viscera.

In accordance with the present invention, a new food for carnivorous animals is provided, containing, for instance, from about 25 to 100% comminuted poultry viscera, the remainder being comminuted proteinaceous solids such as poultry heads, poultry feet, or other by-products of animal or poultry slaughtering operations. For example, comminuted viscera may be mixed with from about 100 to 300 weight percent of proteinaceous material.

A preferred composition of the present invention which is particularly satisfactory as a food for mink or other members of the weasel family or other fur bearing animals, such as dogs, foxes, etc., will comprise from about 25 to 50% by weight of comminuted poultry viscera, the balance comprising comminuted poultry heads and feet.

Having thus described our invention, what is claimed is:

1. A method for preparing a food for carnivorous animals which comprises the steps of comminuting animal viscera, passing the comminuted viscera into an expanding zone in the presence of water, expanding the comminuted viscera by reducing the pressure of said water, feeding the expanded viscera into a flowing stream of water to provide a slurry, and filtering said slurry to provide a substantially feces-free solid filtered fraction as said feed.

2. A method for preparing a food for carnivorous animals which comprises grinding feces contaminated viscera to provide particles having a maximum dimension of less than about one-quarter inch, subjecting said ground viscera to subatmospheric pressure in the presence of water to thereby expand and exfoliate the ground particles thereof, washing said exfoliated particles with a jet of water to thereby substantially completely dissolve the feces of the viscera in the water and to provide a slurry of ground particles in said aqueous solution of feces, filtering said slurry to remove the aqueous solution of feces from said solid particles, and washing said solid filtered particles with fresh water to remove occluded filtrate to thereby provide a substantially feces-free animal food.

3. A method for preparing a food for carnivorous animals which comprises grinding feces contaminated animal viscera to provide particles having a maximum dimension of less than about one-quarter inch, subjecting said ground viscera to subatmospheric pressure in the presence of water to thereby expand and exfoliate the ground particles thereof, washing said exfoliated particles with a jet of water to thereby substantially completely dissolve the feces of the viscera in the water and to provide a slurry of ground particles in said aqueous solution of feces, filtering said slurry to remove from said solid particles a filtrate comprising said aqueous solution, washing said solid filtered particles with fresh water to remove occluded solution, and mixing from about 100 to about 300 weight percent of proteinaceous material with the solid particles to provide a substantially feces-free food for carnivorous animals.

4. A method for preparing a substantially feces-free food for carnivorous animals which comprises the steps of grinding poultry viscera to provide particles having maximum dimension of not more than about one-quarter inch, passing the ground viscera into an expansion zone educing said ground viscera under sub-atmospheric pressure from said zone into a jet of water to thereby expand said ground particles of viscera and wash said expanded particles substantially free from feces whereby a slurry of ground particles of viscera in an aqueous solution of feces is provided, and separating said ground particles from said aqueous solution to thereby provide a food for carnivorous animals.

5. A method as in claim 4 wherein the slurry contains from about 5 to 50 weight percent of ground particles.

6. A method as in claim 5 wherein the separated particles are mixed with unground proteinaceous material and wherein the resultant mixture is thereafter ground to provide a homogeneous substantially feces-free food composition.

7. A method as in claim 6 wherein the ground viscera particles comprise from about 25 to about 50 weight percent of the food.

References Cited by the Examiner

UNITED STATES PATENTS

| | | | |
|---|---|---|---|
| Re. 25,138 | 3/62 | Brown et al. | 99—7 |
| 2,261,224 | 11/41 | Christensen | 99—235 |
| 2,418,311 | 4/47 | McFarlane et al. | 99—2 |
| 2,622,028 | 12/52 | Torr | 99—107 |
| 2,622,029 | 12/52 | Torr | 99—107 |
| 2,819,966 | 1/58 | Colby et al. | 99—2 |
| 2,970,532 | 2/61 | Shelton | 99—235 |

FOREIGN PATENTS 343,770   3/60   Switzerland.

A. LOUIS MONACELL, *Primary Examiner.*

BEATRICE H. STRIZAK, *Examiner.*